US012683965B1

(12) United States Patent

Raghunandanan et al.

(10) Patent No.: US 12,683,965 B1

(45) Date of Patent: *Jul. 14, 2026

(54) DIFFERENTIATING BETWEEN HUMAN INTERACTION AND COMPUTER INTERACTION USING A NATURAL PERCEPTION OF HUMAN EYES TO IDENTIFY HUMAN USERS

(71) Applicant: Gen Digital Inc., Tempe, AZ (US)

(72) Inventors: Rahul T Raghunandanan, Chennai (IN); Vikas Chakravarthy Srinivas, Coimbatore (IN)

(73) Assignee: GEN DIGITAL INC., Tempe, AZ (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/929,919

(22) Filed: Oct. 29, 2024

Related U.S. Application Data

(63) Continuation of application No. 17/705,863, filed on Mar. 28, 2022, now Pat. No. 12,177,218.

(51) Int. Cl.
H04L 9/40 (2022.01)
H04L 15/16 (2006.01)

(52) U.S. Cl.
CPC .............. H04L 63/10 (2013.01); H04L 15/16 (2013.01); H04L 63/108 (2013.01); H04L 63/12 (2013.01)

(58) Field of Classification Search
CPC ....... H04L 63/10; H04L 15/16; H04L 63/108; H04L 63/12

(Continued)

(56) References Cited

U.S. PATENT DOCUMENTS 8,661,246 B1 * 2/2014 Hoech ................... H04L 9/3263
713/168
9,194,769 B1 11/2015 Senibi
(Continued)

FOREIGN PATENT DOCUMENTS

AU 2007254703 B2 * 6/2010
AU 2013312252 A1 3/2015
(Continued)

OTHER PUBLICATIONS

Maio, Alyssa; StudioBinder—"What is Persistence of Vision? Definition of an Optical Phenomenon"; May 11, 2020; Webpage; located at: https://www.studiobinder.com/blog/what-is-persistence-of-vision-definition/; accessed on Mar. 28, 2022.
(Continued)

*Primary Examiner* — Khanh Q Dinh
(74) *Attorney, Agent, or Firm* — MASCHOFF BRENNAN

(57) ABSTRACT

Differentiating between human interaction and computer interaction using a natural perception of human eyes to identify human users. One or more images may be displayed within one or more test fields on a web page. The one or more images themselves, or a duration for which they are presented, may cause a human eye to not see something that is in the images or to see something that is not in the images. Input may be received from the user identifying all images that are perceived by the user. A determination may be made that the user is a human user based on what the user (Continued)

identifies. Access to another web page may be granted to users who are determined to be human and denied to users that are not determined to be human.

4 Claims, 9 Drawing Sheets

(58) Field of Classification Search
USPC .......................................... 709/220, 224–229
See application file for complete search history.

(56) References Cited

U.S. PATENT DOCUMENTS

| | | | | |
|---|---|---|---|---|
| 9,450,901 | B1 | 9/2016 | Smullen | |
| 9,985,943 | B1 | 5/2018 | Reading | |
| 10,097,583 | B1 | 10/2018 | Demiirjian | |
| 10,122,708 | B2 * | 11/2018 | Smith ................. | H04L 41/0894 |
| 10,565,385 | B1 | 2/2020 | Ravi | |
| 11,103,140 | B2 * | 8/2021 | Frank ................. | A61B 5/14532 |
| 12,177,218 | B1 * | 12/2024 | Raghunandanan ..... | H04L 63/10 |
| 2003/0128218 | A1 * | 7/2003 | Struyk ............... | H04N 21/4405 |
| | | | | 345/581 |
| 2016/0006744 | A1 | 1/2016 | Du | |
| 2018/0167394 | A1 * | 6/2018 | High .................... | H04L 63/123 |
| 2019/0200844 | A1 | 7/2019 | Shelton, IV | |
| 2019/0200998 | A1 | 7/2019 | Shelton, IV | |
| 2019/0201136 | A1 | 7/2019 | Shelton, IV | |
| 2019/0201137 | A1 | 7/2019 | Shelton, IV | |
| 2019/0206564 | A1 | 7/2019 | Shelton, IV | |
| 2019/0206569 | A1 | 7/2019 | Shelton, IV | |
| 2019/0334904 | A1 * | 10/2019 | Lelcuk ................. | H04L 9/3213 |
| 2020/0104541 | A1 | 4/2020 | Harrison | |
| 2020/0193009 | A1 | 6/2020 | Shafet | |
| 2020/0322145 | A1 * | 10/2020 | Sheth .................... | H04L 9/3247 |
| 2020/0396233 | A1 | 12/2020 | Luo | |
| 2021/0037048 | A1 | 2/2021 | Kurupati | |
| 2021/0133317 | A1 | 5/2021 | Pham | |
| 2022/0263833 | A1 | 8/2022 | Jones | |
| 2022/0339513 | A1 * | 10/2022 | Beach ................ | G09B 19/0038 |

FOREIGN PATENT DOCUMENTS

| | | | | | |
|---|---|---|---|---|---|
| CN | 116248405 | A | * | 6/2023 | ............. H04L 63/08 |
| JP | 2004532430 | A | * | 10/2004 | ............. G06T 11/23 |

OTHER PUBLICATIONS

Masterclass articles; "Persistence of Vision Explained: What is Persistence of Vision?"; Feb. 25, 2022; Webpage; located at: https://www.masterclass.com/articles/persistence-of-vision-explained#how-does-the-persistence-of-vision-work; accessed on Mar. 28, 2022.

PC Gamer; "How many frams per second can the human eye really see?"; Jan. 19, 2017; Webpage; located at: https://www.pcgamer.com/how-many-frames-per-second-can-the-human-eye-really-see/; accessed on Mar. 28, 2022.

Wikipedia; "Stroboscopic Effect"; Feb. 27, 2022; Online encyclopedia; located at: https://en.wikipedia.org/wiki/Stroboscopic_effect; accessed on Mar. 28, 2022.

Imperva; "Capitalizing on Chaos: Cybercriminals Increase Attacks on Vulnerable Retailers in 2021 As Global Supply Chair Crisis Worsens"; Nov. 3, 2021; Webpage; located at: https://www.imperva.com/company/press_releases/2021-ecomm-threat-report/; accessed on Mar. 28, 2022.

Infosecurity Group; "Holiday Shopping Disruption Beckons as Retail Bot Attached Surge 13%"; Nov. 3, 2021; Webpage; located at: https://www.infosecurity-magazine.com/news/holiday-disruption-retail-bot/; accessed on Mar. 28, 2022.

Security; "1.3 billion bot attacks were detected in Q3 of 2020"; Nov. 13, 2020; Webpage; located at: https://www.securitymagazine.com/articles/93920-3-billion-bot-attacks-were-detected-in-q3-of-2020; accessed on Mar. 28, 2022.

Helpnetsecurity; "Bot attack vols. growing 41% year over year, human-initiated attacked down 29%"; Sep. 16, 2021; Webpage; located at: https://www.helpnetsecurity.com/2021/09/16/bot-attack-volumes/; accessed on Mar. 28, 2022.

Maketecheasier; "How to bypass Google ReCAPTCHA Images"; Jun. 15, 2021; Webpage; located at: https://www.maketecheasier.com/bypass-google-recaptcha-images/; accessed on Mar. 28, 2022.

Animation Nuggets; "How does the persistence of vision work"; 2019; Webpage; located at: https://animation-nuggets.com/en/understanding-the-persistence-of-vision/; accessed on Mar. 28, 2022.

Nvidia, Geforce; "Why does High FPS Matter for Esports?"; Dec. 3, 2019; Webpage; located at: https://www.nvidia.com/en-us/geforce/news/what-is-fps-and-how-it-helps-you-win-games/; accessed on Mar. 28, 2022.

Healthline; "Visual Acuity Test"; Sep. 29, 2018; Webpage; located at: https://www.healthline.com/health/visual-acuity-test; accessed on Mar. 28, 2022.

* cited by examiner

280

282

284

270

290

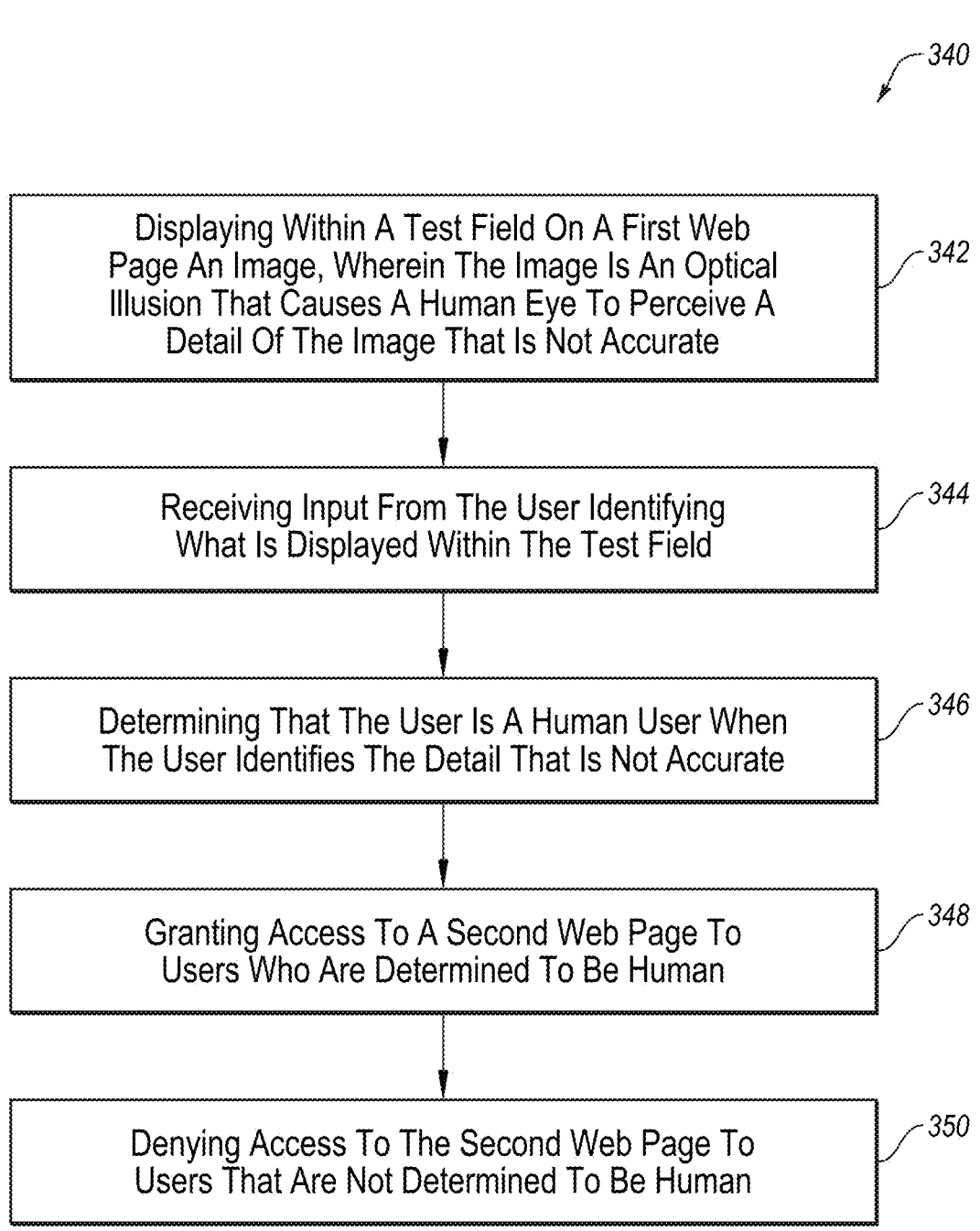

*340*

Displaying Within A Test Field On A First Web Page An Image, Wherein The Image Is An Optical Illusion That Causes A Human Eye To Perceive A Detail Of The Image That Is Not Accurate — *342*

Receiving Input From The User Identifying What Is Displayed Within The Test Field — *344*

Determining That The User Is A Human User When The User Identifies The Detail That Is Not Accurate — *346*

Granting Access To A Second Web Page To Users Who Are Determined To Be Human — *348*

Denying Access To The Second Web Page To Users That Are Not Determined To Be Human — *350*

*FIG. 3C*

DIFFERENTIATING BETWEEN HUMAN INTERACTION AND COMPUTER INTERACTION USING A NATURAL PERCEPTION OF HUMAN EYES TO IDENTIFY HUMAN USERS

CROSS-REFERENCE TO RELATED APPLICATION

This application is a continuation of U.S. patent application Ser. No. 17/705,863 filed Mar. 28, 2022, the entire disclosure of which is incorporated herein by reference.

BACKGROUND

Many websites limit access to one or more of their web pages. For example, some websites limit access to authorized users by requiring users to provide unique credentials, such as a username and password, in order to gain access to a web page. Other websites limit access to web pages by requiring users to pass a test. Some of these tests are designed to distinguish between human users, who are authorized to access the restricted web pages from non-human, automated users, such as BOTS, that are not authorized to access the restricted web pages.

Website operators have strong incentives to restrict BOTs from accessing their web pages. BOTs are a threat to Internet security. If allowed access, they can increase the load on a server to an extent that the website becomes inaccessible. They can make unauthorized edits on a web page and engage in brute force attacks, where the BOT is able to quickly enter many different variations of passwords until the correct password is discovered. They may also engage in a number of different fraudulent activities.

Tests that attempt to distinguish between human and non-human users, such as Turing Tests, "CAPTCHAs" (Completely Automated Public Turing tests to tell Computers and Humans Apart), and other BOT-identification mechanisms have been developed. However, these BOT-identification mechanisms have not been able to achieve consistent results on effectiveness. Many of the BOTS in use today have been designed to include high quality image recognition and automated intelligence, and are able to gain access to web pages evading many of the BOT-identification mechanisms currently in use.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for differentiating between human interaction and computer interaction using a natural perception of human eyes to identify human users may be performed, at least in part, by a computing device including one or more processors. The method may include displaying within a first test field on a first web page a first image to a user at a first refresh rate, wherein at the first refresh rate the first image is displayed for a duration that is equal to or more than a duration that is required for a human eye to perceive the first image. The method may also include displaying within a second test field on the first web page a second image to the user at a second refresh rate, wherein at the second refresh rate the second image is displayed for a duration that is less than a duration that is required for the human eye to perceive the second image. The method may also include receiving input from the user identifying all images that are perceived by the user and determining that the user is a human user when the user identifies the first image but not the second image. The method may also include granting access to a second web page to users who are determined to be human and denying access to the second web page to users that are not determined to be human.

In some embodiments, the first and second images may be letters or numbers. In some embodiments, the duration that the first image is displayed at the first refresh rate may be more than 60 ms. In some embodiments, the duration that the second image may be displayed at the second refresh rate may be less than 50 ms. In some embodiments, the first image may be displayed in a plurality of instances and between instances of displaying the first image, the first test field may be blank.

In some embodiments, the second image may be displayed in a plurality of instances, and between instances of displaying the second image, a plurality of instances of a third image may be displayed. Each instance of the third image may be displayed for a duration that is less than what is required for the human eye to perceive the third image. The user may be determined to be a human user when the user identifies the first image but not the second image or the third image.

In some embodiments, the first image may be a letter that is displayed in a plurality of instances. Between instances of displaying the letter, other letters may be displayed. These other letters that are displayed may be displayed for durations that are less than what is required for the human eye to perceive the other letters.

In another embodiment, a computer-implemented method for differentiating between human interaction and computer interaction using a natural perception of human eyes to identify human users may be performed, at least in part, by a computing device including one or more processors. The method may include displaying within a test field on a first web page a first image and a second image to a user, wherein the first and second images are displayed for durations that cause a human eye to merge the first and second images together to create a merged image. The method may also include receiving input from the user identifying what is displayed within the test field and determining that the user is a human user when the user identifies the merged image as displayed in the test field. The method may also include granting access to a second web page to users who are determined to be human and denying access to the second web page to users that are not determined to be human.

In some embodiments, the first image may display a first character, the second image may display a second character, and the merged image may include both the first and second images together.

In some embodiments, the first image may display a first color, the second image may display a second color, and the merged image may be a blend of the first and second colors together. In these embodiments, the first color may be blue, the second color may be yellow, and the merged image may be the color green.

In another embodiment, a computer-implemented method for differentiating between human interaction and computer interaction using a natural perception of human eyes to identify human users may be performed, at least in part, by a computing device including one or more processors. The method may include displaying within a test field on a first web page an image, wherein the image is an optical illusion that causes a human eye to perceive a detail of the image that is not accurate. The method may also include receiving input from the user identifying what is displayed within the test field and determining that the user is a human user when the user identifies the detail that is not accurate. The method may also include granting access to a second web page to users who are determined to be human and denying access to the second web page to users that are not determined to be human.

In some embodiments, the image may be a static image that causes the human eye to perceive motion in the image. In these embodiments, the perceived motion may be a rotational motion or an undulating motion.

In some embodiments, the image may cause the human eye to perceive an erroneous geometric detail in the image. In these embodiments, the erroneous geometric detail may be the length of a first line in relation to the length of a second line, the size of a first geometric shape in relation to the size of a second geometric shape, or whether a first line and a second line are parallel.

In some embodiments, the image may cause the human eye to perceive something that is not in the image.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which:

FIGS. 3A-3C are flowcharts of example methods for differentiating between human interaction and computer interaction using a natural perception of human eyes to identify human users.

DETAILED DESCRIPTION

Figure 1:
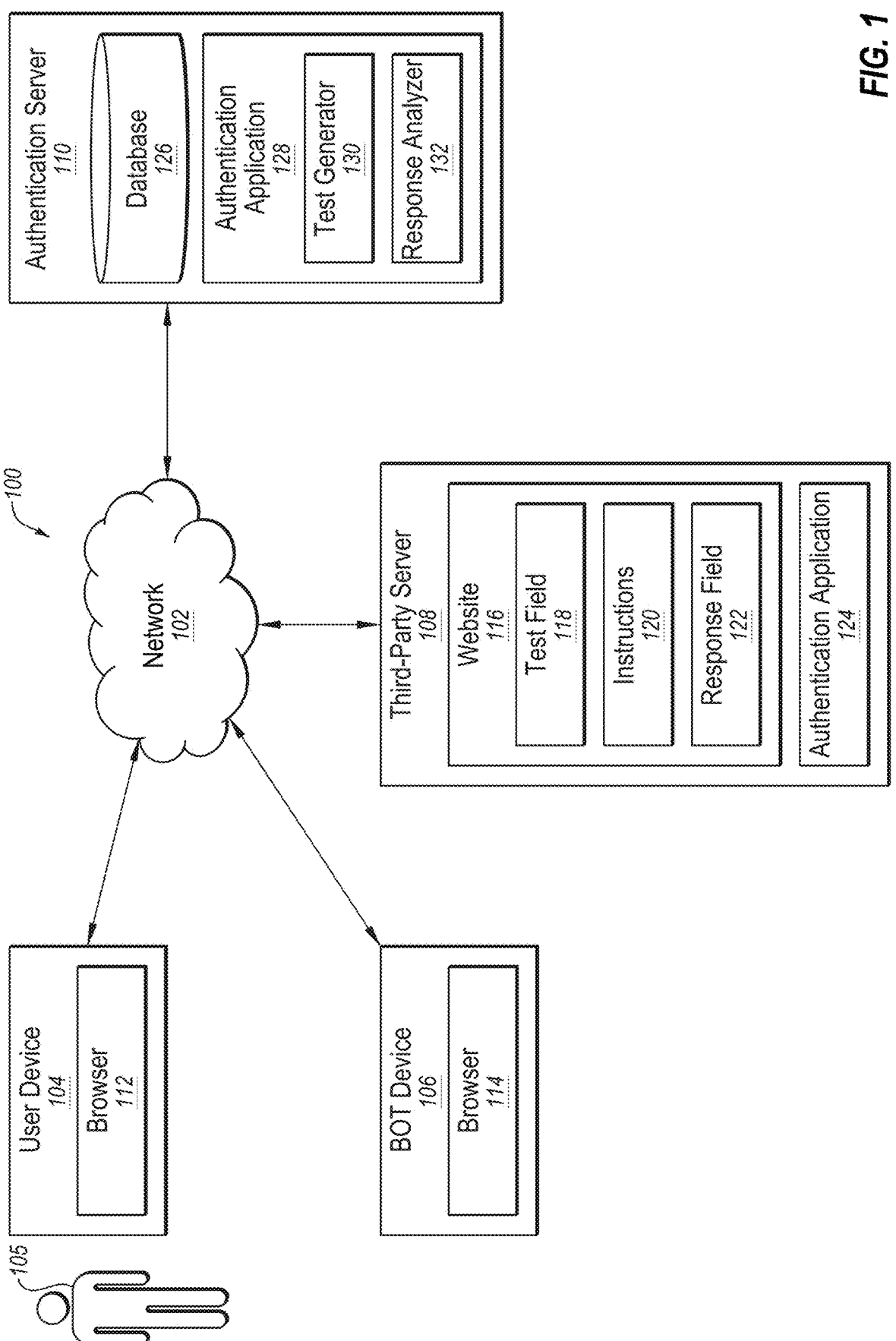
FIG. 1 illustrates an example system configured for differentiating between human interaction and computer interaction using a natural perception of human eyes to identify human users.

Many websites limit access to one or more of their web pages. For example, some websites limit access to authorized users by requiring users to provide unique credentials, such as a username and password, in order to gain access to a web page. Other websites limit access to web pages by requiring users to pass a test. Some of these tests are designed to distinguish between human users, who are authorized to access the web page from non-human, automated users, such as BOTS, that are not authorized to access the web page.

Preventing non-human users from accessing one or more web pages is very important for a website's security. Non-human users such as BOTs can increase the load on a server to an extent that the website becomes inaccessible. Non-human users such as BOTs may be responsible for false purchases and unauthorized edits to data on the web page. Non-human users such as BOTs may engage in brute force attacks, where the BOT is able to quickly enter many different variations of passwords until the correct password is discovered. Advances in quantum computing make these brute force attacks especially concerning for banking, cryptocurrency, and other ecommerce institutions. Non-human users such as BOTs may also engage in fraudulent activities. For example, BOTS may dramatically increase download rates for certain applications, making these applications erroneously appear more popular than they really are.

Tests that attempt to distinguish between human and non-human users, known as Turing tests or "CAPTCHAs" (Completely Automated Public Turing tests to tell Computers and Humans Apart) have been developed. However, these tests and other BOT-identification mechanisms have not been able to achieve consistent results on effectiveness. Many of the BOTS in use today have been designed to include high quality image recognition and automated intelligence, and are able to gain access to web pages by evading many of the BOT-identification mechanisms currently in use.

Many of the BOT-identification mechanisms currently in use attempt to identify non-human users based on a limitation of the non-human user. For example, letters may appear in a swirling orientation that makes them difficult for computers, but not humans, to identify. One complexity facing engineers that design new BOT-identification mechanisms is the fact that computer technology is advancing at a rapid pace. Processing speeds, artificial intelligence, and machine learning techniques are constantly improving. This makes creating a test that is reliably able to identify a non-human user, such as a BOT, based on a limitation of the BOT very difficult. BOT engineers are often able to quickly develop new BOTs that are able to deceive the latest BOT-identification mechanisms.

Unlike the state of computer technology, which evolves rapidly, human evolution moves very slow. This makes the boundaries of human ability consistent and reliable. Human eyes, for example, have limitations that dictate our perception of things. These limitations are fairly standard across all humans. For example, when looking at a ceiling fan, it is simple to see how many blades the fan has when the blades are either not rotating or rotating very slowly. However, when the blades are rotating quickly, it is impossible for human eyes to perceive how many blades are on the fan. A computer (or a camera with a high shutter speed) however, can easily identify the number of blades on a fan even when the blades are rotating very quickly.

In light of the visual limitations that dictate human perception, identifying a human user based on limitations of perception in human eyes may be more reliable than attempting to create a test that identifies a non-human (BOT) user. Therefore, some embodiments disclosed herein may enable differentiating between human interaction and computer interaction using a natural perception of human eyes to identify human users. In particular, some embodiments may display within a first test field on a first web page a first image to a user at a first refresh rate. At the first refresh rate, the first image may be displayed for a duration that is equal to or more than a duration that is required for a human eye to perceive the first image. A second image may be displayed to the user within a second test field on the first web page. At the second refresh rate, the second image may be displayed for a duration that is less than a duration that is required for the human eye to perceive the second image. Input may be received from the user identifying all images that are perceived by the user. A determination may be made that the user is a human user when the user identifies the first image but not the second image. Access to a second web page may be granted to users who are determined to be human and access to the second web page may be denied to users that are not determined to be human.

Other embodiments disclosed herein may display within a test field on a first web page a first image and a second image to a user. The first and second images may be displayed for durations that cause a human eye to merge the first and second images together to create a merged image. Input may be received from the user identifying what is displayed within the test field. A determination may be made that the user is a human user when the user identifies the merged image as displayed in the test field. Access to a second web page may be granted to users who are determined to be human and access to the second web page may be denied to users that are not determined to be human.

Other embodiments disclosed herein may display within a test field on a first web page an image. The image may be an optical illusion that causes a human eye to perceive a detail of the image that is not accurate. Input may be received from the user identifying what is displayed within the test field. A determination may be made that the user is a human user when the user identifies the detail that is not accurate. Access to a second web page may be granted to users who are determined to be human and access to the second web page may be denied to users that are not determined to be human.

In addition to granting or denying access to a web page, the embodiments disclosed herein may also be used to restrict access to any files, fields or areas, including physical areas. For example, one or more of the embodiments disclosed herein may be displayed on a screen and used to restrict access to a physical area or a database from non-human machines, such as robots.

Turning to the figures, FIG. 1 illustrates an example system configured for differentiating between human interaction and computer interaction using a natural perception of human eyes to identify human users. The system 100 may include a network 102, a user device 104 and an associated user 105, a BOT device 106, a third-party server 108, and an authentication server 110.

In some embodiments, the network 102 may be configured to communicatively couple the user device 104, the BOT device 106, the third-party server 108, and the authentication server 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
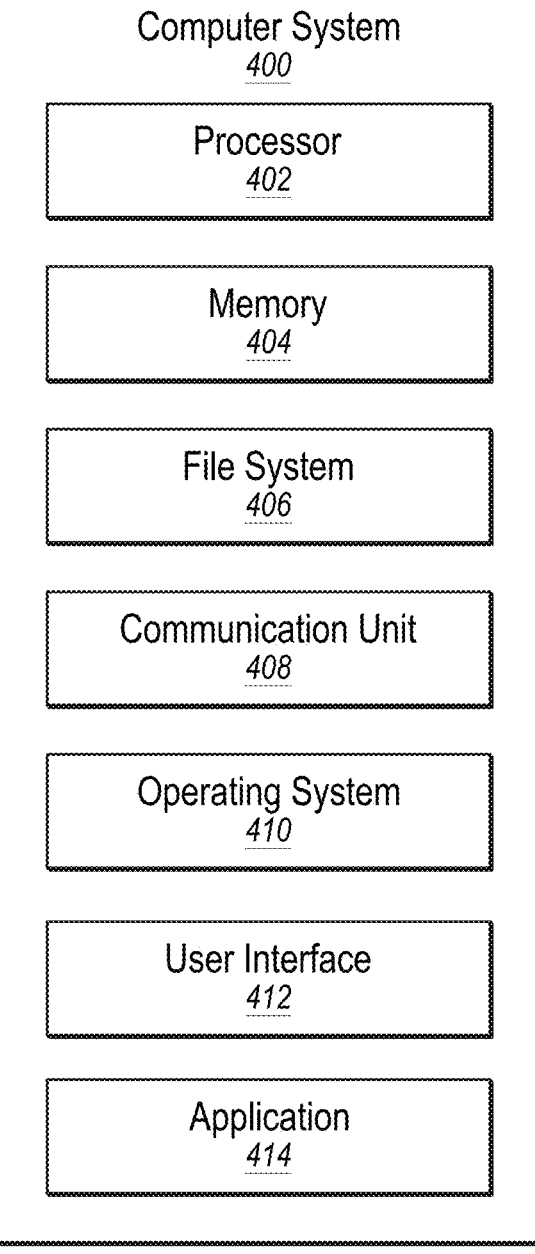
FIG. 4 illustrates an example computer system that may be employed in differentiating between human interaction and computer interaction using a natural perception of human eyes to identify human users.

In some embodiments, the user device 104 may be any computer system capable of communicating over the network 102, examples of which are disclosed herein in connection with the computer system 400 of FIG. 4. The user device 104 may include a browser 112 through which the user 105 may access a variety of websites over the network 102.

In some embodiments, the BOT device 106 may be any computer system capable of communicating over the network 102, examples of which are disclosed herein in connection with the computer system 400 of FIG. 4. The BOT device 106 may include a browser 114 through which a non-human user may access a variety of websites over the network 102.

In some embodiments, the third-party server 108 may be any computer system capable of communicating over the network 102, examples of which are disclosed herein in connection with the computer system 400 of FIG. 4. The third-party server 108 may include a website 116 that is accessible by the browser 112 and the browser 114. The website 116 may include a web page that displays a test field 118, instructions 120, and a response field 122 to a user that is accessing the website 116. The third-party server 108 may also include an authentication application 124 that is configured to communicate with the authentication server 110.

In some embodiments, the authentication server 110 may be any computer system capable of communicating over the network 102, examples of which are disclosed herein in connection with the computer system 400 of FIG. 4. The authentication server 110 may include a database 126 and an authentication application 128. The authentication application 128 may include a test generator 130 and a response analyzer 132. The database 126 may store the tests that are administered by the test generator.

The authentication application 128 may be configured to differentiate between human interaction and computer interaction on the third-party server 108 by using a natural perception of human eyes to identify human users. For example, the test generator 130 may provide a test that is displayed in test field 118. The test presented can take many different forms, as described in more detail in connection with FIG. 2. The test generator 130 may also provide instructions that are displayed in the instructions field 120. These instructions may provide directions for a user on what to enter in the response field 122. Finally, the response analyzer 132 may analyze the responses that are entered into the response field 122. The response analyzer 132 may determine, based on the response provided in the response field 122, whether the user that is accessing the website 108 is human. If the user is determined to be a human user (such as the user 105), access to one or more additional web pages on the website 116 may be granted. If the user is not determined to be a human user (such as the BOT device 106), access to one or more additional web pages on the website 116 may be denied.

Modifications, additions, or omissions may be made to the system 100 without departing from the scope of the present disclosure. For example, the third-party server 108 could be replaced by any area (including physical areas or databases) in which non-human entities (such as robots) are restricted. In such an embodiment, the test field 118, the instructions 120, and the response field 122 may be presented on a display screen outside the restricted area. The display screen may be in communication with the authentication server 110. Depending on a response provided, the authentication server 110 may grant or deny access to the area, such as a room in a building or files within a database. In some embodiments, the system 100 may include additional components similar to the components illustrated in FIG. 1 that each may be configured similarly to the components illustrated in FIG. 1.

Figure 2A:
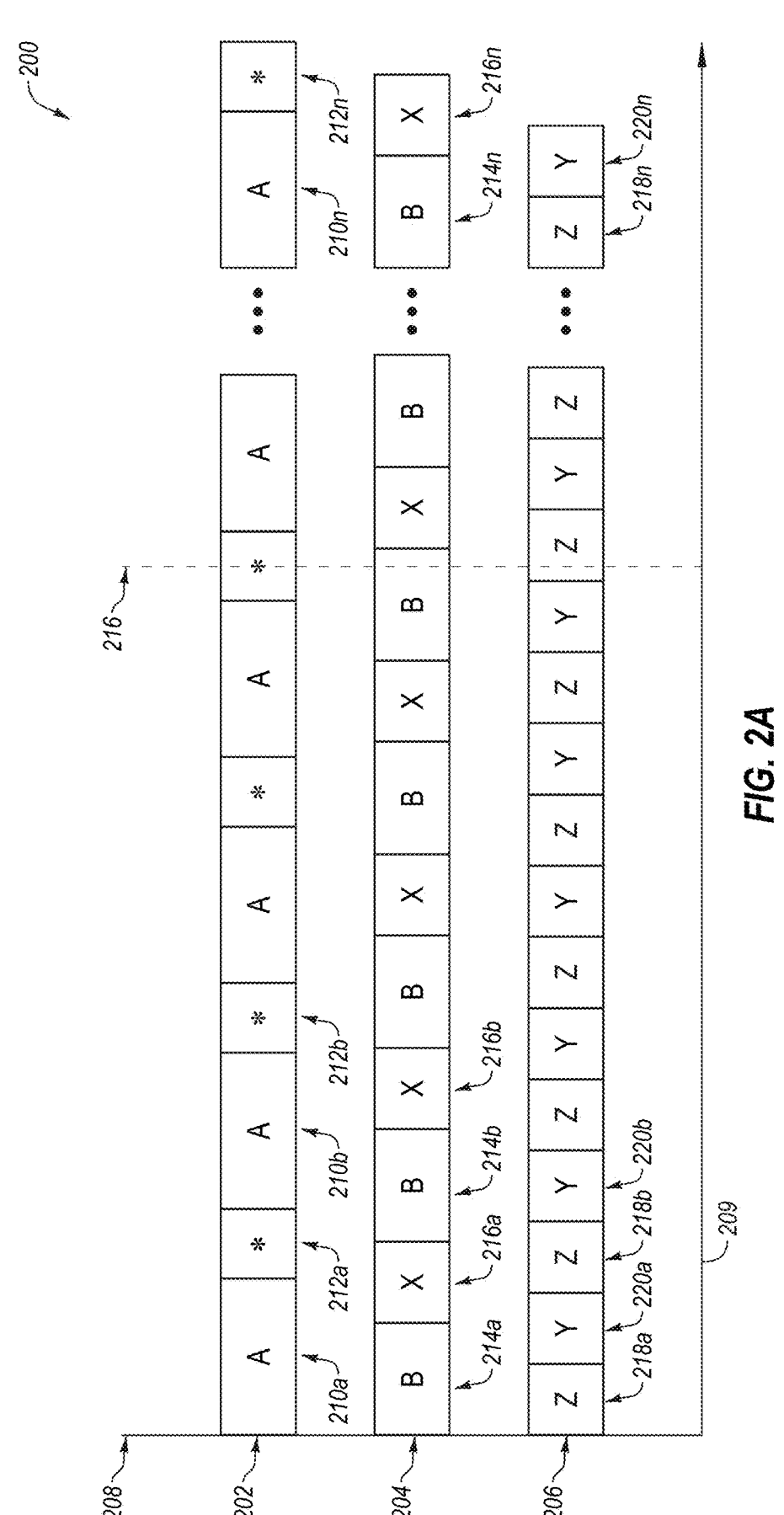
FIGS. 2A-E illustrate tests for differentiating between human interaction and computer interaction using a natural perception of human eyes to identify human users.

FIGS. 2A-E illustrate tests for differentiating between human interaction and computer interaction using a natural perception of human eyes to identify human users. For example, FIG. 2A illustrates a first chart 200 of a test that can be implemented for differentiating between human interaction and computer interaction using a natural perception of human eyes to identify human users. The first chart 200 illustrates graphically what may be displayed to a user in test fields 202, 204, and 206 over time 209. The test field 202 may display a plurality of instances of the letter A 210a, 210*b*, . . . 210*n* over a period of time 209. Instances of the letter A may be displayed at a refresh rate in which each instance of the letter A 210*a*, 210*b*, . . . 210*n* is displayed for a duration that is equal to or more than a duration that is required for a human eye to perceive the letter A within the test field 202. In one embodiment, the duration of each instance of the letter A 210*a*, 210*b*, . . . 210*n* may be equal to or more than 60 ms.

Once an image has been displayed to a human eye for a duration that is equal to or more than a duration that is required for the human eye to perceive that image, it will be retained by the eye for a short period of time after the removal of the stimulus that produced it. This concept is known as "persistence of vision." An image may be retained by the eye for between 50 ms and 60 ms. Therefore, any images that are displayed to a human eye during this "persistence of vision" period of time, but do not exceed it, will not be perceived by the eye.

Between each instance of the letter A 210*a*, 210*b*, . . . 210*n*, the test field 202 may be a blank space, which is represented instances of the character * 212*a*, 212*b*, . . . 212*n*. The duration of the blank space 212*a*, 212*b*, . . . 212*n* may be more or less than what is required for a human eye to perceive these blank space. In one embodiment of the present invention, between instances of displaying A 210*a*, 210*b*, . . . 210*n*, blank spaces 212*a*, 212*b*, . . . 212*n* may be displayed for a duration that is equal to or more than a duration that is required for a human eye to perceive the blank space 212*a*, 212*b*, . . . 212*n*. In other embodiments, between instances of displaying A 210*a*, 210*b*, . . . 210*n*, blank spaces 212*a*, 212*b*, . . . 212*n* may be displayed for a duration that is less than a duration that is required for a human eye to perceive the blank space 212*a*, 212*b*, . . . 212*n*.

The test field 204 may display a plurality of instances of the letter B 214*a*, 214*b*, . . . 214*n* over a period of time 209. Like instances of the letter A, instances of the letter B may be displayed at a refresh rate in which each instance of the letter B 210*a*, 210*b*, . . . 210*n* is displayed for a duration that is equal to or more than a duration that is required for a human eye to perceive the letter B within the test field 204. In one embodiment, the duration of each instance of the letter B 214*a*, 214*b*, . . . 214*n* may be equal to or more than 60 ms.

Between each instance of the letter B 214*a*, 214*b*, . . . 214*n*, the test field 204 may display a plurality of instances of the letter X 216*a*, 216*b*, . . . 216*n*. The duration for which each instance of the letter X is displayed in test field 214 may be less than what is required for a human eye to perceive these instances of the letter X 216*a*, 216*b*, . . . 216*n*. In one embodiment, the duration of each instance of the letter X 216*a*, 216*b*, . . . 216*n* may be less than 40 ms.

In some embodiment, other letters, symbols, or spaces may be displayed between instances of letter B 214*a*, 214*b*, . . . 214*n*. These other letters, symbols, or spaces may each be displayed for a duration that is less than what is required for human perception so that the only symbol perceivable by human eyes in the test field 204 is the letter B.

The test field 206 may display a plurality of instances of the letter Z 218*a*, 218*b*, . . . 218*n* over a period of time 209. Instances of the letter Z may be displayed at a refresh rate in which each instance of the letter Z 218*a*, 218*b*, . . . 218*n* is displayed for a duration that is less than a duration that is required for a human eye to perceive the letter B within the test field 204. In one embodiment, the duration of each instance of the letter Z 218*a*, 218*b*, . . . 218*n* may be less than 40 ms.

In addition to the instances of the letter Z, a plurality of instances of the letter Y 220*a*, 220*b*, . . . 220*n* may also be displayed in the test field 206. Like instances of the letter Z, instances of the letter Y may be displayed at a refresh rate in which each instance of the letter Y 220*a*, 220*b*, . . . 220*n* is displayed for a duration that is less than a duration that is required for a human eye to perceive the letter Y within the test field 206. In one embodiment, the duration of each instance of the letter Y 220*a*, 220*b*, . . . 220*n* may be less than 40 ms.

In some embodiment, other letters, symbols, or spaces may be displayed in the test field 206 in addition to the letters Z and Y. These other letters, symbols, or spaces may each be displayed for a duration that is less than what is required for human perception so that no letters, symbols, or spaces are capable of being perceived by human eyes in the test field 206.

The images displayed in the test fields 202, 204, and 206 may initiate at a time 208. A user viewing the images displayed in the test fields 202, 204, and 206 may be asked to identify all images that are perceived by the user. A human user will identify all images that are capable of being perceived by the human eye, which in the case of first chart 200, are the letters A and B. Therefore, where a user identifies the letters A and B as perceived, that user may be determined to be a human user.

The human eye will not be able to perceive instances of the letters X, Y, or Z. Therefore, if any letters in addition to the letters A and B are identified as being perceived by the user, the user may not be identified as a human user. For example, if a BOT is designed to take a snapshot of what is displayed in the test fields 202, 204, and 206 at a particular point in time, such as the time 216, the BOT will perceive a blank space in the test field 202, a B in the test field 204, and a Z in the test field 206. If the letters B and Z are identified as perceived in the test fields, the user may not be determined to be a human user.

In some embodiments, the images that are perceivable by human eyes in a first and second field may be staggered so that the images that are perceivable by human eyes are not displayed at the same time. This will ensure that a non-human user that takes a snapshot of the first and second fields will not capture, at the same time, both images that are perceivable by human eyes. At any given time, a snapshot will always be lacking at least one of the images that are perceivable by human eyes.

Figure 2B:
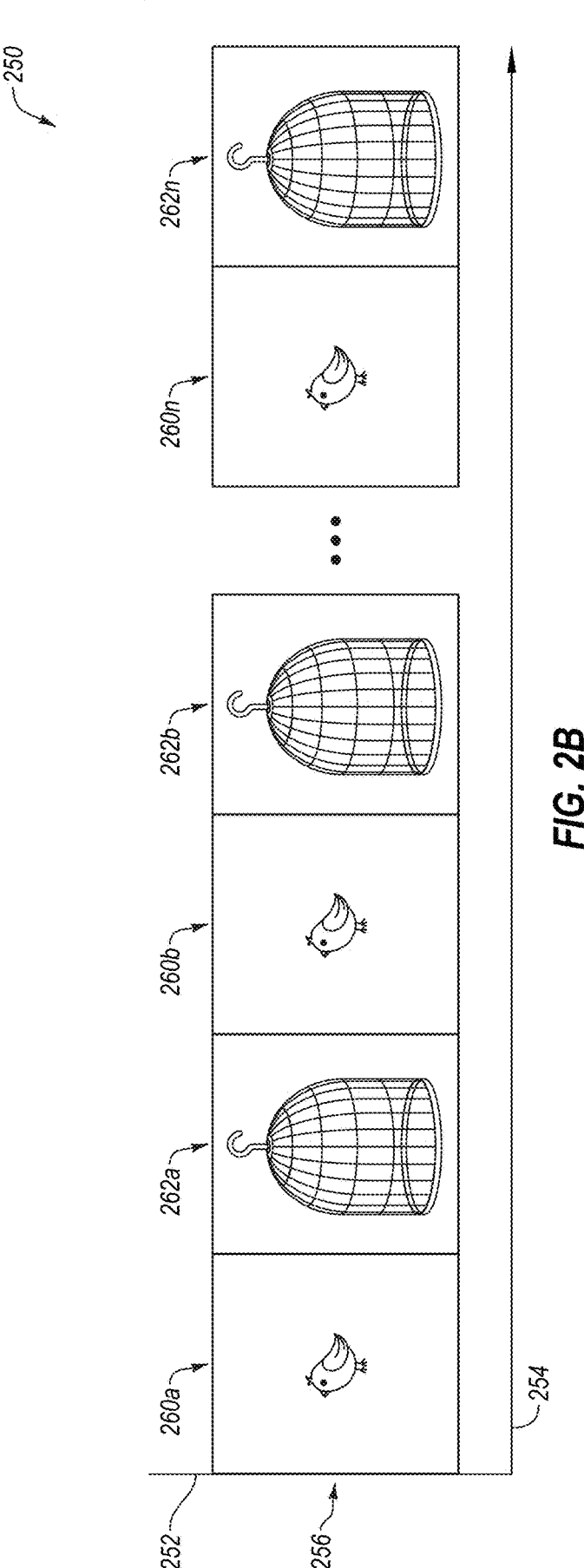

FIG. 2B illustrates a second chart 250 of a test that can be implemented for differentiating between human interaction and computer interaction using a natural perception of human eyes to identify human users. The second chart 250 illustrates graphically what may be displayed to a user in a test field 256 over time 254. The test field 256 may display a plurality of instances of a picture of a bird 260*a*, 260*b*, . . . 260*n* over a period of time 254. In addition to instances of the bird 260*a*, 260*b*, . . . 260*n*, the test field 256 may also display a plurality of instances of a picture of an empty cage 262*a*, 262*b*, . . . 262*n* over a period of time 254.

Instances of the bird 260*a*, 260*b*, . . . 260*n* and the empty cage 262*a*, 262*b*, . . . 262*n* may be displayed for durations that cause a human eye to merge the bird and empty cage images together to create a merged image of the bird inside the cage. In one embodiment, the duration of each instance of the bird 260*a*, 260*b*, . . . 260*n* and the empty cage 262*a*, 262*b*, . . . 262*n* may be equal to or more than 60 ms. However, the duration of each instance of the bird 260*a*, 260*b*, . . . 260*n* and the empty cage 262*a*, 262*b*, . . . 262*n* may be less than a time required for a human eye to see each instance of the bird 260*a*, 260*b*, . . . 260*n* and the empty cage 262*a*, 262*b*, . . . 262*n* as separate images.

The images displayed in the test field 256 may initiate at a time 252. A user viewing the images displayed in the test field 256 may be asked to identify the image that the user perceives in the test field 256. A human user will identify the image that is perceived by the human eye, which in the case of the test field 256, is a bird within a cage even though this image is never actually displayed. When a user identifies a bird within a cage, that user may be determined to be a human user. The human eye will not be able to perceive individual instances of the bird or empty cage individually. Therefore, if either a bird or an empty cage is identified as being perceived by the user, the user may not be identified as a human user.

In addition to two or more images that are displayed at durations that cause the human eye to merge them, two or more separate colors may be displayed at durations that cause the human eye to merge the colors. For example, a test field may display a plurality of instances of a yellow panel and a plurality of instances of a blue panel. Instances of these color panels may be displayed for durations that cause a human eye to merge the colors so that the human eye will see the color green. When a user identifies the color green within the test field, that user may be determined to be a human user. If either of the colors blue or yellow are identified as appearing within the test field, the user may not be identified as a human user.

Figure 2D:
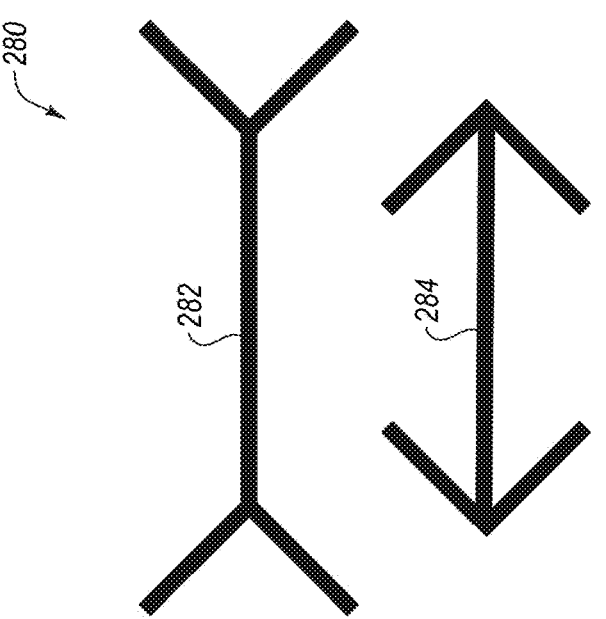
Figure 2C:
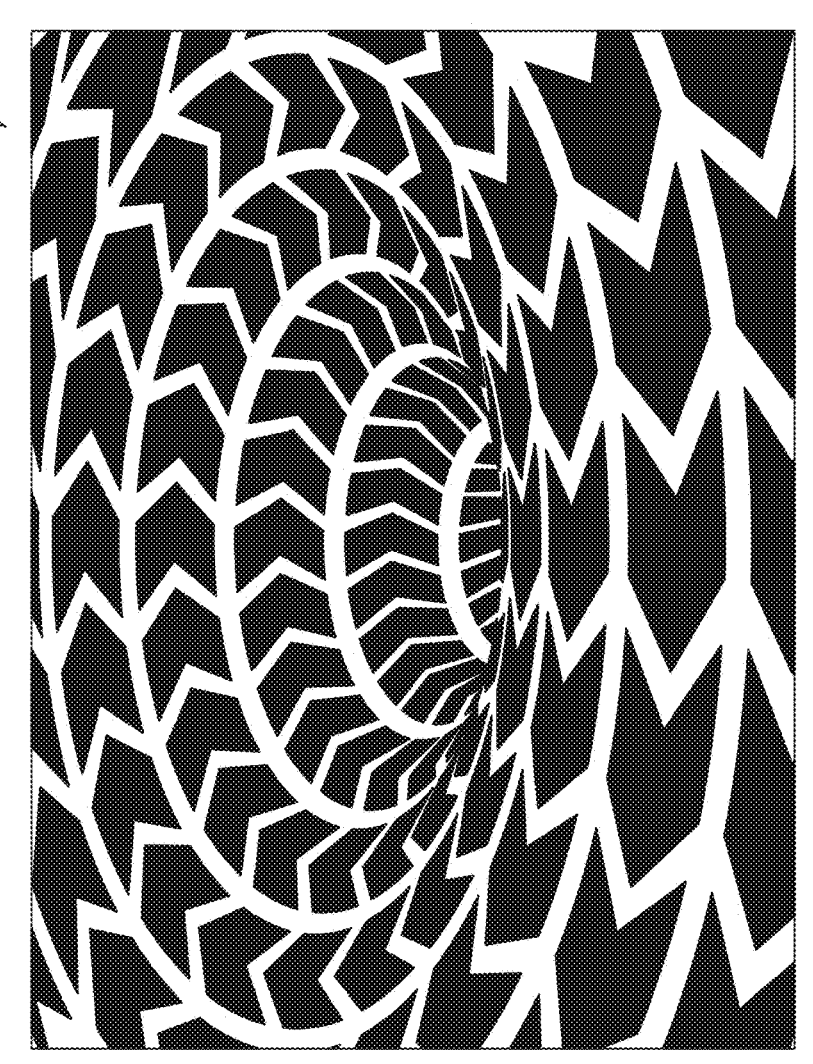

FIG. 2C illustrates a first optical illusion 270 that can be implemented for differentiating between human interaction and computer interaction using a natural perception of human eyes to identify human users. The optical illusion 270 may be displayed to a user. Due to the shapes of the arrows and dimensions of the optical illusion 270, it may cause the human eye to perceive rotation, even though the figure is static. Other optical illusions may cause the human eye to perceive up and down movement, side to side movement, in and out movement, an undulating movement, etc. Regardless of the direction or form of the movement, these optical illusions may be displayed to users and users may be asked to identify what if any movement they perceive in the image. If the user identifies the movement that would be perceived by the human eye, that user may be determined to be human. If this movement is not identified properly, the user may not be determined to be human.

FIG. 2D illustrates a second optical illusion 280 that can be implemented for differentiating between human interaction and computer interaction using a natural perception of human eyes to identify human users. Unlike the first optical illusion 270, the second optical illusion 280 does not cause a human eye to perceive movement. Rather, the second optical illusion 280 causes the human eye to perceive an erroneous geometrical detail. Specifically, the second optical illusion 280, causes human eyes to perceive that the line 282 is longer than the line 284. Therefore, a user may be asked to identify which of lines 282 and 284 appear longer. If a user identifies the line 282 as longer than the line 284, that user may be determined to be human. If the user identifies the line 284 as longer than the line 282, or that the lines 282 and 284 are the same length (which is in fact the case), the user may not be determined to be human.

In addition to line sizes, other optical illusions that causes a human eye to perceive an erroneous geometric detail includes sizes of related shapes, and relationships between lines, such as whether two or more lines are parallel.

Figure 2E:
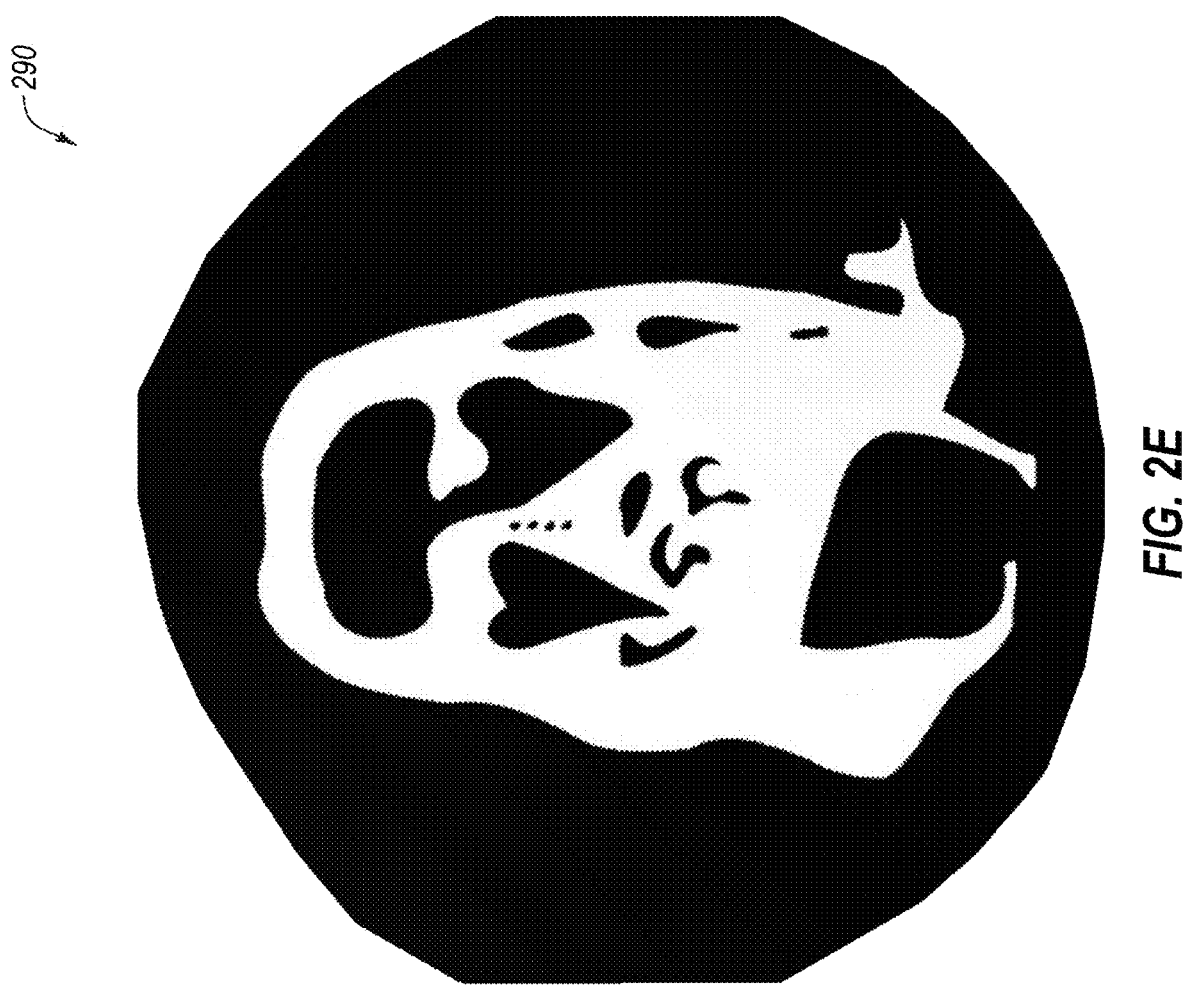

FIG. 2E illustrates a third optical illusion 290 that can be implemented for differentiating between human interaction and computer interaction using a natural perception of human eyes to identify human users. The third optical illusion 290 is known as a "negative after-image" and requires the user to stare at a spot in an image for a length of time, such as 30 second or a minute. After staring for the required amount of time, another image will appear to the user when the user closes his or her eyes or blinks rapidly. In the case of the third optical illusion 290, an image of Jesus will appear to human eyes.

Any type of optical illusion that causes a human eye to perceive a detail of an image that is not accurate, such as movement (as shown in the optical illusion 270) or an erroneous geometrical dimension such as length (as shown in the optical illusion 280), or an image or feature that appears after staring at an image for a period of time (as shown in the optical illusion 290), could be used to differentiate between human interaction and computer interaction. Other optical illusions cause things to appear in an image that do not exist. For example, some optical illusions show a grid that appears to have spots in the intersections of grid lines.

Figure 3A:
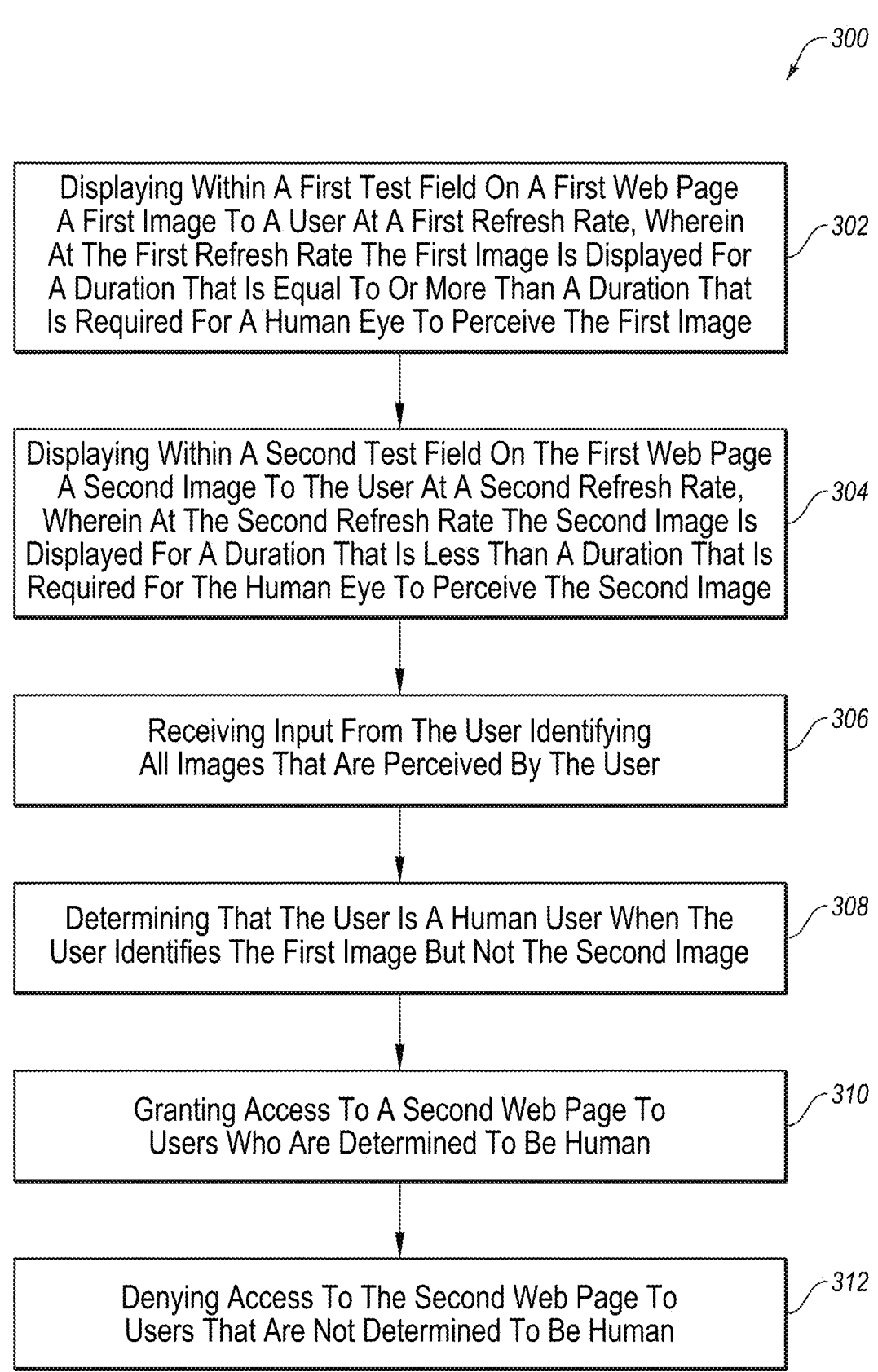
Figure 3B:
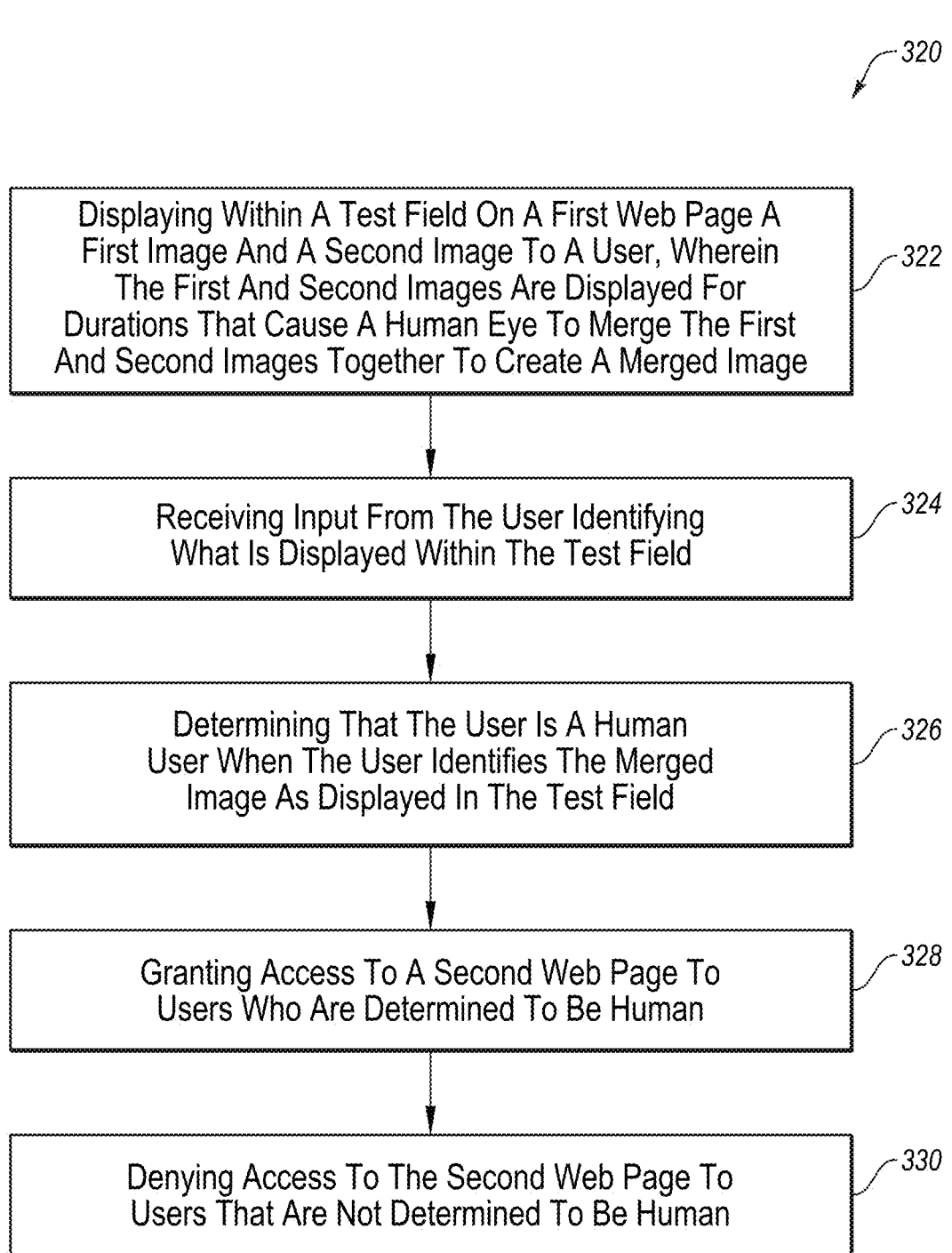

FIGS. 3A-3C are flowcharts of example methods for differentiating between human interaction and computer interaction using a natural perception of human eyes to identify human users. For example, FIG. 3A illustrates a flowchart of a first example method 300 for differentiating between human interaction and computer interaction using a natural perception of human eyes to identify human users. The method 300 may be performed, in some embodiments, by a device or system such as the authentication application 128 of FIG. 1. In these and other embodiments, the method 300 may be performed by one or more processors based on one or more computer-readable instructions stored on one or more non-transitory computer-readable media.

The method 300 may include, at action 302, displaying within a first test field on a first web page a first image to a user at a first refresh rate, wherein at the first refresh rate the first image is displayed for a duration that is equal to or more than a duration that is required for a human eye to perceive the first image. In some embodiments, the first image may be a letter or a number. In some embodiments the duration that the first image is displayed at the first refresh rate is more than 60 ms. In some embodiments, the first image may be displayed in a plurality of instances and between instances of displaying the first image, the first test field may be blank. In other embodiments, other images may be displayed between instances of displaying the first image. These other images may be displayed for a duration that is less than what is required for the human eye to perceive the third image. For example, these other images may be displayed for less than 50 ms.

The method 300 may include, at action 304, displaying within a second test field on the first web page a second image to the user at a second refresh rate, wherein at the second refresh rate the second image is displayed for a duration that is less than a duration that is required for the human eye to perceive the second image. In some embodiments, the second image may be a letter or a number. In some embodiments the duration that the second image is displayed at the second refresh rate is less than 50 ms. In other embodiments, other images may be displayed between instances of displaying the second image. These other images may be displayed for a duration that is also less than what is required for the human eye to perceive the third image. For example, these other images may also be displayed for less than 50 ms.

The method 300 may include, at action 306, receiving input from the user identifying all images that are perceived by the user. This input may be received in response to instructions that specify what the user is to submit. For example, the user may be instructed to identify all images that are perceived in the test fields.

The method 300 may include, at action 308, determining that the user is a human user when the user identifies the first image but not the second image. In embodiments where additional images are displayed between instances of the first and second images, the user will be determined to be a human user when these additional images are also not identified by the user.

The method 300 may include, at action 310, granting access to a second web page to users who are determined to be human and, at action 312, denying access to the second web page to users that are not determined to be human.

FIG. 3B illustrates a flowchart of a second example method 320 for differentiating between human interaction and computer interaction using a natural perception of human eyes to identify human users. The method 320 may be performed, in some embodiments, by a device or system such as the authentication application 128 of FIG. 1. In these and other embodiments, the method 320 may be performed by one or more processors based on one or more computer-readable instructions stored on one or more non-transitory computer-readable media.

The method 320 may include, at action 322, displaying within a test field on a first web page a first image and a second image to a user, wherein the first and second images are displayed for durations that cause a human eye to merge the first and second images together to create a merged image. For example, the first and second images, or more, may be displayed to the user so that the user perceives a single image that includes elements from all of the images displayed. In one embodiment, the first image may be a first color and the second image may be a second color. The merged image may be a blend of the first and second images. For example, the first image may be the color blue and the second image may be the color yellow. The merged image, which is perceived by the user in this embodiment, may be the color green.

The method 320 may include, at action 324, receiving input from the user identifying what is displayed within the test field. The method 320 may include, at action 326, determining that the user is a human user when the user identifies the merged image as displayed in the test field.

The method 320 may include, at action 328, granting access to a second web page to users who are determined to be human and, at action 330, denying access to the second web page to users that are not determined to be human.

FIG. 3C illustrates a flowchart of a third example method 340 for differentiating between human interaction and computer interaction using a natural perception of human eyes to identify human users. The method 340 may be performed, in some embodiments, by a device or system such as the authentication application 128 of FIG. 1. In these and other embodiments, the method 340 may be performed by one or more processors based on one or more computer-readable instructions stored on one or more non-transitory computer-readable media.

The method 340 may include, at action 342, displaying within a test field on a first web page an image, wherein the image is an optical illusion that causes a human eye to perceive a detail of the image that is not accurate. In some embodiments, the image may be a static image but causes the human eye to perceive motion. This motion may be rotational, undulating, up and down movement, in and out movement, etc. In another embodiment, the image may cause the human eye to perceive an erroneous geometrical detail in the image. For example, the erroneous geometric detail is the length of a first line in relation to the length of a second line. In another example, the erroneous geometric detail may be the size of a first geometric shape in relation to the size of another geometric shape. In yet another example, the erroneous geometric detail may be whether a first line and a second line are parallel. In another embodiment, the image may cause the human eye to perceive something that does not exist in the image. For example, shades of color or shapes that do not exist in the image may be perceived to exist by the human eye.

The method 340 may include, at action 344, receiving input from the user identifying what is displayed within the test field. The method 340 may include, at action 346, determining that the user is a human user when the user identifies the detail that is not accurate.

The method 340 may include, at action 348, granting access to a second web page to users who are determined to be human and, at action 350, denying access to the second web page to users that are not determined to be human.

The methods, 300, 320, and 340 may thus be employed, in some embodiments, to differentiate between human interaction and computer interaction using a natural perception of human eyes to identify human users. By using perceptions of human eyes to identify human users, these tests may differentiate between humans and non-humans more reliably than tests that attempt to identify non-human users. Although the actions of the methods 300, 320, and 340 are illustrated in FIGS. 3A-3C as discrete actions, various actions may be divided into additional actions, combined into fewer actions, reordered, expanded, or eliminated, depending on the desired implementation.

Further, it is understood that the methods 300, 320, and 340 may improve the functioning of a computer system itself. For example, by identifying and excluding non-human users from their pages, websites may be protected from the maladies that non-human users can inflict on websites. This includes the very functionality of the website itself, which may crash if non-human users are allowed access.

Also, the methods 300, 320, and 340 may improve the technical field of BOT-identification. Many BOT-identification mechanisms currently in use attempt to identify BOTs based on limitations in the BOT. For example, a CAPTCHA may display a number of pictures and require the user to identify all pictures that include a bike or a bus, or some other physical element. Human users are able to identify these pictures fairly easily, but BOTs can sometimes struggle to understand what is in the pictures. However, computer technology is advancing at a rapid pace and it does not take long for BOT engineers to develop BOTs that are able to get past new tests that attempt to exploit a limitation in computing. Unlike the tests that attempt to identify non-human users, the methods 300, 320, and 340 attempt to identify human users by using limitations of perception that exist in human eyes. As provided in the above methods, these tests may cause a human eye to either not see something that is in one or more images or to see something that is not in the one or more images. By using limitations of perception in human eyes, tests that distinguish human users from non-human users can be reliably designed that will identify humans and that will be difficult for BOT engineers to replicate in non-human users.

FIG. 4 illustrates an example computer system that may be employed in differentiating between human interaction and computer interaction using a natural perception of human eyes to identify human users. In some embodiments, the computer system 400 may be part of any of the systems or devices described in this disclosure. For example, the computer system 400 may be part of any of the user device 104, the BOT device 106, the third-party server 108, and the authentication server 110 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the authentication application 124 and the authentication application 128 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the authentication application 124 or the authentication application 128.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for differentiating between human interaction and computer interaction using a natural perception of human eyes to identify human users, at least a portion of the method being performed by a computing device comprising one or more processors, the method comprising:

displaying within a test field on a first web page a first image and a second image to a user, wherein the first and second images are displayed for durations that cause a human eye to merge the first and second images together to create a merged image, wherein the first image displays a first character, the second image displays a second character, and the merged image includes both the first and second images together;

receiving input from the user identifying what is displayed within the test field;

determining that the user is a human user when the user identifies the merged image as displayed in the test field;

granting access to a second web page to users who are determined to be human; and denying access to the second web page to users that are not determined to be human.

2. A computer-implemented method for differentiating between human interaction and computer interaction using a natural perception of human eyes to identify human users, at least a portion of the method being performed by a computing device comprising one or more processors, the method comprising:

displaying within a test field on a first web page an image, wherein the image is an optical illusion that causes a human eye to perceive a detail of the image that is not accurate an erroneous geometric detail in the image, the erroneous geometric detail being a length of a first line in relation to a length of a second line;

receiving input from the user identifying what is displayed within the test field;

determining that the user is a human user when the user identifies the detail that is not accurate;

granting access to a second web page to users who are determined to be human; and denying access to the second web page to users that are not determined to be human.

3. A computer-implemented method for differentiating between human interaction and computer interaction using a natural perception of human eyes to identify human users, at least a portion of the method being performed by a computing device comprising one or more processors, the method comprising:

displaying within a test field on a first web page a first image and a second image to a user, wherein the first and second images are displayed for durations that cause a human eye to merge the first and second images together to create a merged image, wherein the first image displays a first color, the second image displays a second color, and the merged image is a blend of the first and second colors together;

receiving input from the user identifying what is displayed within the test field;

determining that the user is a human user when the user identifies the merged image as displayed in the test field;

granting access to a second web page to users who are determined to be human; and denying access to the second web page to users that are not determined to be human.

4. The method of claim 3, wherein the first color is blue, the second color is yellow, and the merged image is the color green.

\* \* \* \* \*